United States Patent [19]

(12) United States Patent
Bono et al.

(10) Patent No.: US 9,378,261 B1
(45) Date of Patent: Jun. 28, 2016

(54) UNIFIED SYNCHRONOUS REPLICATION FOR BLOCK AND FILE OBJECTS

(71) Applicant: EMC Corporation, Hopkinton, MA (US)

(72) Inventors: Jean-Pierre Bono, Westborough, MA (US); Himabindu Tummala, South Grafton, MA (US); Assaf Natanzon, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 267 days.

(21) Appl. No.: 14/041,176

(22) Filed: Sep. 30, 2013

(51) Int. Cl.
*G06F 17/30* (2006.01)
(52) U.S. Cl.
CPC ................................. *G06F 17/30581* (2013.01)
(58) Field of Classification Search
CPC .................................................. G06F 17/30212
See application file for complete search history.

(56) References Cited

U.S. PATENT DOCUMENTS

| 7,254,685 | B1 | 8/2007 | Cardente |
| 7,631,155 | B1 | 12/2009 | Bono et al. |
| 7,783,850 | B2 * | 8/2010 | Vu et al. .................. 711/162 |
| 8,335,771 | B1 * | 12/2012 | Natanzon et al. ............. 707/684 |
| 8,341,115 | B1 * | 12/2012 | Natanzon et al. ............. 707/613 |
| 8,433,869 | B1 | 4/2013 | Natanzon et al. |
| 2003/0014523 | A1 * | 1/2003 | Teloh et al. .................... 709/226 |
| 2004/0030668 | A1 | 2/2004 | Pawlowski et al. |
| 2005/0256972 | A1 * | 11/2005 | Cochran et al. ............... 709/245 |
| 2009/0313503 | A1 | 12/2009 | Atluri et al. |
| 2011/0282834 | A1 * | 11/2011 | Desai et al. ................... 707/611 |
| 2012/0303576 | A1 * | 11/2012 | Calder et al. .................. 707/611 |

OTHER PUBLICATIONS

Bono, "Unified Datapath Architecture," U.S. Appl. No. 13/828,322, filed Mar. 14, 2013.
Bono, et al., "Unified Datapath Processing With Virtualized Storage Processors," U.S. Appl. No. 13/828,294, filed Mar. 14, 2013.
Bono, et al., et al., "Automatically Creating Multiple Replication Sessions in Response to a Single Replication Command Entered by a User," U.S. Appl. No. 13/837,825, filed Mar. 15, 2013.
Bono, et al., "Unified Data Protection for Block and File Objects," U.S. Appl. No. 13/853,508, filed Mar. 29, 2013.

(Continued)

*Primary Examiner* — Khanh Pham
(74) *Attorney, Agent, or Firm* — BrainwoodHuang

(57) ABSTRACT

A technique for performing synchronous replication on both block and file-based objects provides a data storage system that internally stores data objects (e.g., LUNs, file systems, block-based vVOLs (virtual volumes), file-based vVOLs, VMDKs, etc.) in the form of respective files, such that each file provides a realization of a data object. The data storage system maps each such file to a respective logical volume, and each logical volume provides a block-based interface. As the data storage system receives IO requests specifying data to be written to a data object, the data storage system renders the IO requests as block-based requests, regardless of whether the IO requests are themselves block-based or file-based. A block-based replication splitter intercepts the block-based requests directed to the logical volumes and performs block-based, synchronous replication on the requests, thereby achieving synchronous replication of both block-based objects and file-based objects in a single, unified architecture.

20 Claims, 7 Drawing Sheets

(56) References Cited

OTHER PUBLICATIONS

Bono, et al., "Preserving Quality of Service When Replicating Data Objects," U.S. Appl. No. 14/576,939 filed Dec. 19, 2014.
EMC Corporation, "EMC Celerra Replicator," (http://chucksblog.emc.com/content/CelerraReplicator.pdf) 2008.
EMC Corporation, "EMC RecoverPoint Family," (http://www.emc.com/collateral/software/data-sheet/h2769-recoverpoint-ds.pdf) Aug. 2013.
EMC Corporation, "EMC Business Continuity and Disaster Recovery Solutions," (https://enterpriseportalcontent.mci.com/NR/rdonlyres/7A037904-A72F-4C79-BC21-4731442BFD9A/0/SoCDREventEMCReplicationRW.pdf) 2008.
EMC Corporation, "Array-Based Replication with EMC VPLEX," (http://www.emc.com/collateral/hardware/white-papers/h8005-array-based-replication-vplex-wp.pdf) Aug. 2010.
EMC Corporation, "Using EMC Celerra Replicator," Feb. 2009.

\* cited by examiner

UNIFIED SYNCHRONOUS REPLICATION FOR BLOCK AND FILE OBJECTS

BACKGROUND

Data storage systems commonly employ replication solutions for protecting the data they store. Conventional replication solutions furnish either block-based solutions, e.g., for replicating LUNs (Logical Unit Numbers—although the term generally refers to the units themselves) or file-based solutions, e.g., for replicating file systems or individual files. Block-based solutions operate on storage volumes, e.g., using Fibre Channel or iSCSI (Internet Small Computer System Interface) protocols, whereas file-based solutions operate on files and file systems, e.g., using NFS (Network File System), CIFS (Common Internet File System), or SMB 3.0 (Server Message Block) protocols.

A well-known example of a block-based replication solution is the RecoverPoint system available from EMC Corporation of Hopkinton, Mass. RecoverPoint systems include a replication splitter realized in software, e.g., on a storage processor (SP) that accesses a local block-based array, one or more local replication appliances, and one or more remote replication appliances connected to a remote array configured as a replica site. As a data storage system receives IO requests specifying data to be written to a particular LUN on the local block-based array, the replication splitter intercepts the IO request and sends it to the local replication (or appliances), e.g., over a Fibre Channel or iSCSI connection. The local appliance communicates with the remote appliance, e.g., over a WAN (Wide Area Network), and manages the storage of the data specified in the IO request at the replica site. In this manner, the replica site is made to store data that provide a redundant copy of data on the LUN, which may be used to recover the contents of the LUN in the event of a failure on the local array.

A well-known example of a file-based replication solution is the Celerra Replicator™ V2, also available from EMC Corporation of Hopkinton, Mass. Replicator V2 includes software for performing replication on files and file systems. Replicator V2 operates by taking snaps (e.g., point in time copies, also known as "snapshots" or "checkpoints") of files and file systems at a local site, comparing current snaps with previous snaps, identifying differences, and sending the differences to a destination site. The destination site accumulates and stores the differences, which can be reconstituted to recover the file or file system being replicated in the event of a failure at the local site. File-based replication solutions often provide advanced features for establishing and maintaining replication sessions, managing recovery and failover, and ensuring that particular settings and restrictions applied to file systems being replicated carry over to replicas at the destination site.

SUMMARY

Block-based replication solutions and file-based replication solutions each operate effectively in their respective domains (block and file). Concurrent efforts are underway, however, to develop data storage systems having unified data paths for serving both block-based objects and file-based objects. Users of such systems could benefit from a more unified data replication solution that can support replication of both block-based objects and file-based objects.

In contrast with prior replication solutions, an improved technique performs synchronous replication on both block-based objects and file-based objects. In accordance with the improved technique, a data storage system internally stores data objects (e.g., LUNs, file systems, block-based vVOLs (virtual volumes), file-based vVOLs, VMDKs, etc.) in the form of respective files, such that each file provides a realization of a data object. The data storage system maps each such file to a respective logical volume, and each logical volume provides a block-based interface. As the data storage system receives IO requests (e.g., from hosts) specifying data to be written to a data object, the data storage system renders the IO requests as block-based requests, regardless of whether the IO requests are themselves block-based or file-based. A block-based replication splitter intercepts the block-based requests directed to the logical volumes and performs block-based, synchronous replication on the block-based requests, thereby achieving synchronous replication of both block-based objects and file-based objects in a single, unified architecture. The improved technique thus typically results in a reduced need for multiple, diverse replication solutions, and thus fewer items that must be purchased, learned, and maintained, with benefits extending to users and manufacturers alike.

In some examples, the improved technique achieves further benefits by adapting management software for file-based replication solutions to provide common replication management across all object types. Thus, the advanced features that file-based replication solutions deliver, e.g., for establishing and maintaining replication sessions, managing recovery and failover, and ensuring that particular settings and restrictions applied to file systems being replicated carry over to replicas at the destination site, can be leveraged across all object types, whether they be block-based or file-based.

In accordance with improvements hereof, certain embodiments are directed to a method of performing synchronous replication in a data storage system. The method includes storing, in the data storage system, a file that provides a realization of a host file system and receiving, in a file-based format, an IO request specifying data to be written to the host file system. The method further includes mapping the IO request to a block-based request that specifies data to be written in a block-based format, sending the block-based request to a replication appliance configured to replicate block-based requests at a replication site, and receiving an acknowledgement from the replication appliance that the data specified in the block-based request sent to the replication appliance have been persisted. The method still further includes, in response to receiving the acknowledgement, processing the block-based request to effect a write operation on the file that provides the realization of the host file system.

Other embodiments are directed to a data storage apparatus constructed and arranged to perform the method described above. Still other embodiments are directed to a computer program product. The computer program product stores instructions, which when executed on one or more processing units of a data storage apparatus, cause the data storage apparatus to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique performs synchronous replication on both block-based objects and file-based objects via a single, unified replication architecture that expresses both block-based IOs and file-based IOs as block-based requests directed to internal logical volumes that realize both block-based objects and the file-based objects. The improved technique thus typically results in a reduced need for multiple, diverse replication solutions, and thus in fewer items that must be purchased, learned, and maintained.

This document is presented in sections to assist the reader in identifying desired information. In the material that follows:

Section I presents an example environment in which improved techniques hereof may be practiced and describes, inter alia, a unified datapath architecture for expressing both block-based objects and file-based objects as respective underlying volumes and underlying files, which enables the use of a common replication approach for both block-based and file-based objects.

Section II presents particular example improvements for effecting synchronous replication of both block-based and file-based objects on a per-data-object basis under the direction of a common replication session manager.

Figure 1:
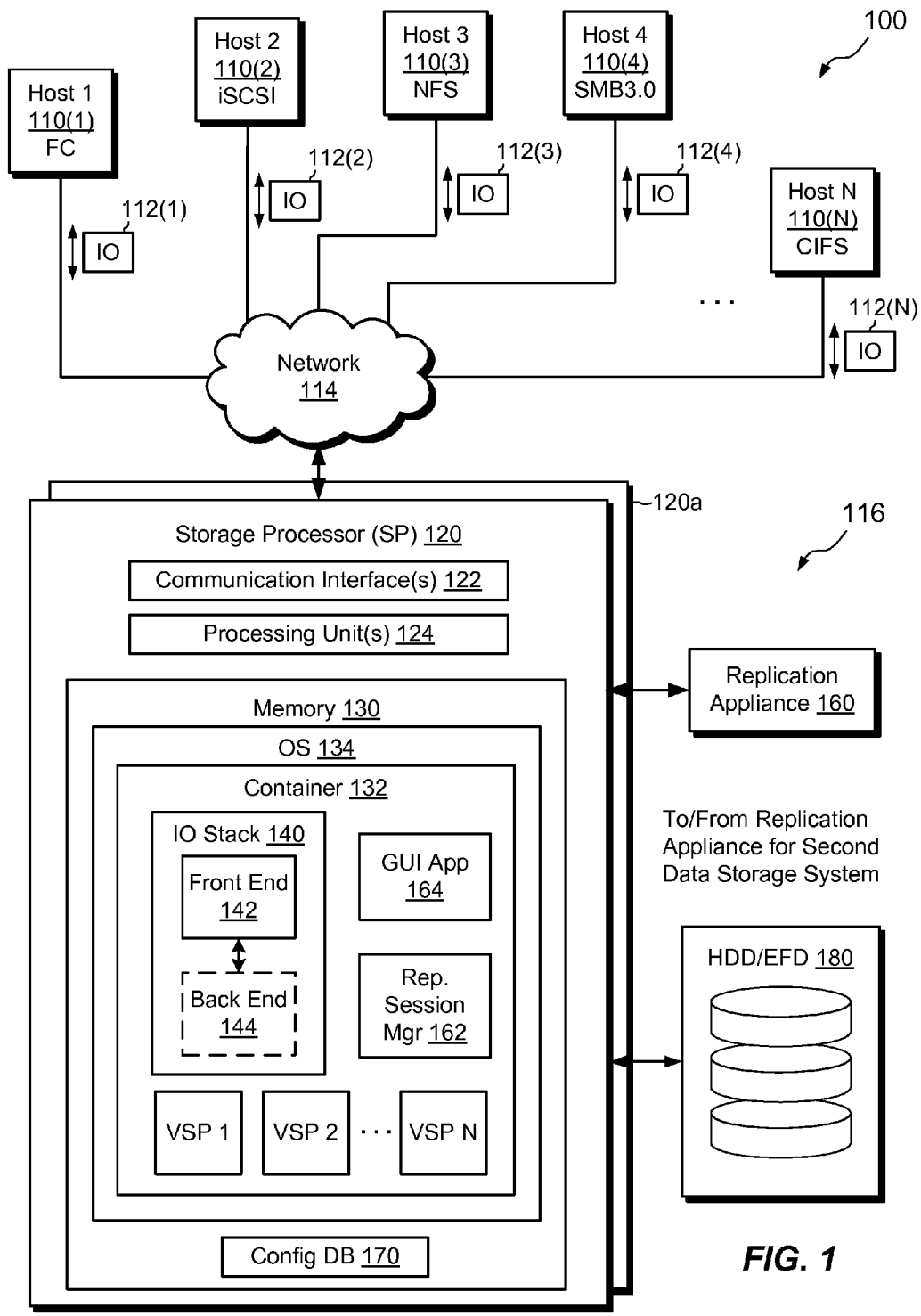
FIG. 1 is a block diagram showing an example environment in which improved techniques hereof may be practiced, wherein the example environment includes a data storage system having a storage processor.

I) Example Environment Including Unified Datapath Architecture:

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. The data storage system 116 may include multiple SPs like the SP 120 (see, for example, a second SP 120a). For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel (not shown) and can communicate with one another using inter-process communication (IPC) mediated by the kernel. Containers are well-known features of Unix, Linux, and other operating systems.

In the example of FIG. 1, only a single container 132 is shown. Running within the container 132 is an IO stack 140, a replication session manager 162, a Graphical User Interface (GUI)-based application 164, and multiple VSPs (Virtualized Storage Processors) VSP 1 to VSP N. A VSP is a collection of data objects, internal file systems, and servers (e.g., NFS and/or CIFS servers), which together provide a mechanism for grouping objects and providing a common set of network interfaces such that the VSP appears from outside the SP 120 as similar to a physical SP. More information about VSPs may be found in copending U.S. patent application Ser. No. 13/828,294, filed Mar. 14, 2013, the contents and teachings of which are hereby incorporated by reference in their entirety. Although certain components are shown residing within the container 132, alternatively different components reside in different containers. For example, the GUI-application 164 may run within a dedicated container and communicate with the replication session manager 162 using IPC.

The IO stack 140 provides an execution path for host IOs (e.g., IO requests 112(1-N)) and includes a front end 142 and a back end 144. In alternative arrangements, the back end 144 is located on another SP (e.g., SP 120*a*) or is provided in a block-based array connected to the SP 120 (e.g., in a gateway configuration).

The replication appliance 160 assists in performing block-based replication of both block-based objects and file-based objects to a second data storage system, which may be located locally to the data storage system 116 or remotely. In an example, the replication appliance 160 takes the form of a hardware unit, and multiple such units may be provided, e.g., for supporting strong data compression and other advanced features. For purposes of this document, it is understood that this document refers to the replication appliance 160 as a single component, although that component include any number of units, which operate in coordination with one another, e.g., in a cluster.

The replication session manager 162 controls the establishment of replication settings on particular data objects, including VSPs. The replication session manager 162 establishes replication settings on a per-data-object basis, conducts replication sessions with replica sites, and orchestrates replication activities, including recovery and failover activities.

The GUI application 164 provides a user interface for configuring the replication session manager 162, e.g., for establishing replication settings on particular data objects. As the IO stack 140, replication appliance 160 (optionally), replication session manager 162, and GUI application 164 all run within the same container 132, the IO stack 140, replication appliance 160 (optionally), and replication session manager 162 can communicate with one another using APIs (application program interfaces) and pointer passing and without the need to use IPC.

The memory 130 is further seen to include a configuration database 170. The configuration database 170 stores configuration information pertaining to the data storage system 116, including information about the VSPs 1-N and the data objects with which they are associated. In other implementations, the data storage system 116 stores the configuration database 170 elsewhere, such as or in the storage 180, on a disk drive of flash drive separate from the SP 120 but accessible to the SP 120, e.g., over a backplane or network, or in some other location.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include mapping IO requests directed to LUNs, host file systems, vVOLs (virtual volumes, e.g., as soon available for VMware, Inc. of Palo Alto, Calif.), VMDKs (virtual memory disks), and other data objects to block-based requests presented to internal volumes, as well as mapping the internal volumes to respective files stored in a set of internal file systems of the data storage system 116. Host IO requests received at the SP 120 for reading and writing block-based objects and file-based objects are thus converted to reads and writes of respective volumes, which are then converted to reads and writes of respective files. As will be described further below, the front end 142 may perform block-based synchronous replication at the level of the internal volumes, where the front end 142 presents both block-based objects and file-based objects in block-based form. After processing by the front end 142, the IO requests propagate to the back end 144, where the back end 144 executes commands for reading and/or writing the physical storage 180, agnostically to whether the data read and/or written is directed to a block-based object or a file-based object.

Figure 2:
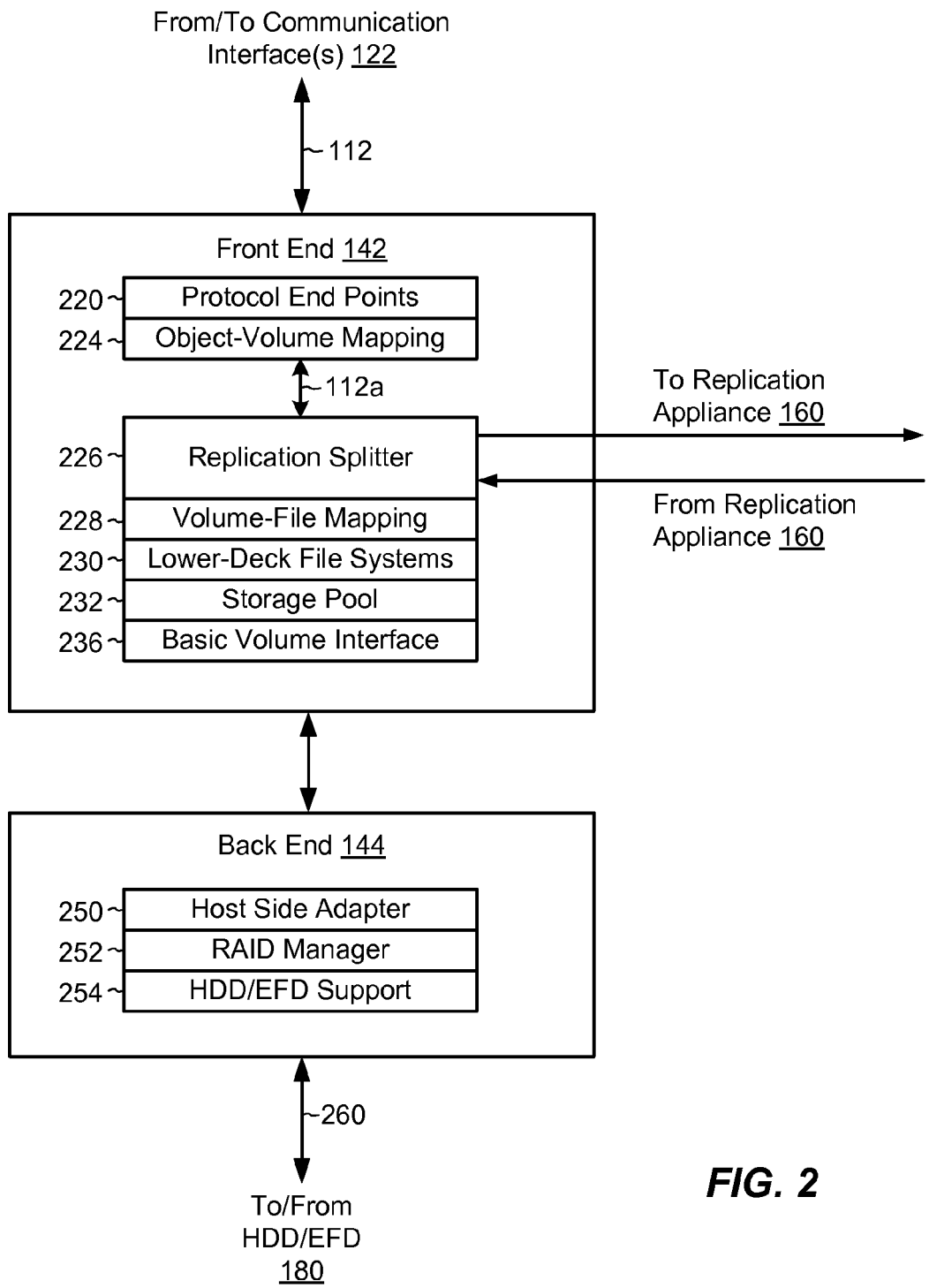
FIG. 2 is a block diagram showing an example IO stack of the storage processor shown in of FIG. 1.

FIG. 2 shows the front end 142 and back end 144 of the IO stack 140 in additional detail. Here, the front end 142 is seen to include protocol end points 220, a data object layer 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), for ease of understanding, the different components of the IO stack 140 are described herein from the bottom up.

At the back end 144, the hard disk drive/electronic flash drive support 254 includes drivers that perform the actual reading from and writing to the storage 180. The RAID manager 252 accesses particular storage units (slices) written or read using RAID protocols. The host side adapter 250 provides an interface to the front end 142, for instances in which the front end 142 and back end 144 are run on different machines. When the front end 142 and back end 144 are co-located on the same SP, as they are in FIG. 1, the host side adapter 250 may be omitted or made to perform no operation.

Continuing to the front end 142, the basic volume interface 236 provides an interface to the back end 144 for instances in which the front end 142 and back end 144 are run on different hardware, The basic volume interface 236 may also be inactive in the arrangement shown in FIG. 1.

The storage pool 232 organizes elements of the storage 180 in the form of slices. A "slice" is an increment of storage space, such as 256 MB or 1 GB in size, which is derived from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed by the RAID manager 252, dividing the RAID groups into FLUs (Flare LUNs), and further dividing the FLU's into slices.

The lower-deck file systems 230 are built upon slices managed by a storage pool 232 and represent both block-based objects and file-based objects internally in the form of files. The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself and, in some instances includes other files that store snaps of the file that stores the data object. Each lower-deck file system 230 has an inode table. The inode table provides a different inode for each file stored in the respective lower-deck file system. The inode table may also store properties of the file(s), such as their ownership and block locations at which the file's/files' data are stored.

The volume-file mapping 228 maps each file representing a data object to a respective volume, which is accessible using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets in the volume, the volume-file mapping 228 can establish a one-to-one correspondence between offsets into the file and offsets into the corresponding internal volume, thereby providing the requisite mapping needed to express the file in the form of a volume.

The replication splitter 226 sits above the volume-file mapping 228. The replication splitter 226 is configurable by the replication session manager 162 on a per-data-object basis to intercept IO requests and to replicate the data specified to be written in such requests according to data-object-specific settings. Depending on the data object to which the IO request is directed and the replication settings defined for that object, the replication splitter 226 may allow IO requests it receives to pass through to the volume-file mapping 228 unimpeded (e.g., if no replication is specified for that data object). Alternatively, the replication splitter 226 may intercept the IO request, forward the request to the replication appliance 160, and hold the request until the replication splitter 226 receives an acknowledgement back from the replication appliance 160. Once the acknowledgement is received, the replication splitter 226 may allow the IO request to continue propagating down the IO stack 140. It should be understood that the replication session manager 162 can configure the replications splitter 226 in a variety of ways for responding to different types of IO requests. For example, replication session manager 162 can configure the replication splitter 226 to operate in a pass-through mode for control IOs and for IO requests specifying data reads. In some situations, the replication session manager 162 can configure the replication splitter 226 to intercept reads as well as writes. In any such situations, the replication session manager 162 can configure the replication splitter 226 on a per-data-object basis.

The object-volume mapping layer 224 maps internal volumes to respective data objects, such as LUNs, host file systems, and vVOLs. Mapping underlying volumes to host-accessible LUNs may simply involve a remapping operation from a format compatible with the internal volume to a format compatible with the LUN. Mapping internal volumes to host file systems, however, may be accomplished in part by leveraging from the fact that file systems are customarily built upon volumes, such that an underlying volume is part of the structure of a host file system. Host file systems, also called "upper-deck file systems," are thus built upon the internal volumes presented by the volume-file mapping 228 to provide hosts with access to files and directories. Mapping of vVOLs can be achieved in similar ways. For block-based vVOLs, the object-volume mapping layer 224 may perform mapping substantially as it does for LUNs. File-based vVOLs may be mapped, for example, by converting host-specified offsets into vVOL files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based vVOLs) using Fiber Channel or iSCSI and may expose file-based objects (e.g., host file systems, file-based vVOLs, and VMDKs) using NFS, CIFS, or SMB 3.0, for example.

In operation, the IO stack 140 receives an IO request 112 specifying data to be written to a particular data object. The object-volume mapping 224 maps the IO request 112 to a block-based request 112a directed to an internal volume. The replication splitter 226 may intercept the block-based request 112a and send the block-based request 112a to the replication appliance 160 (or may pass through the IO request, depending on settings established by the replication session manager 162 for the data object). Assuming the replication splitter 226 intercepts the block-based request 112a, the replication appliance 160 coordinates with other components to replicate the data specified in the block-based request 112a at a second site and provides the replication splitter 226 with an acknowledgement. When the replication splitter 226 receives the acknowledgement, the replication splitter 226 allows the block-based request 112a to continue propagating down the IO stack 140. The volume-file mapping 228 maps the block-based request 112a to one that is directed to a particular file of a lower-deck file system, and the back end 144 and storage 180 process the IO request by writing the specified data to actual media. In this manner, the IO stack 140 supports both local storage of the data specified in the IO request 112 and replication at a second site.

Figure 3:
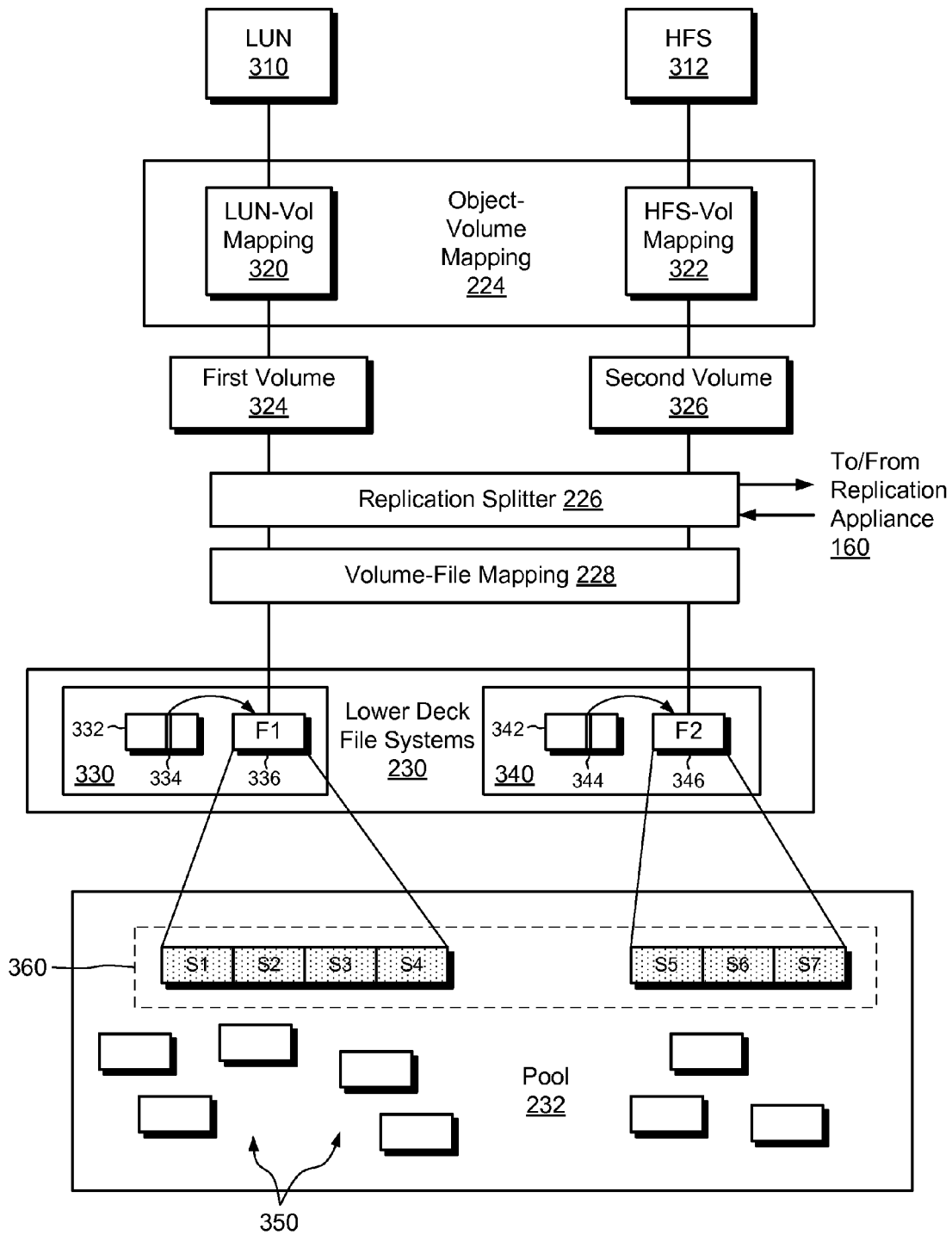
FIG. 3 is a block diagram showing example features of the IO stack of FIG. 2 in additional detail.

FIG. 3 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. Using the approach described above, the LUN-to-Volume mapping 320 maps the LUN 310 to a first volume 324, and the HFS-to-Volume mapping 322 maps the HFS 312 to a second volume 326. The replication splitter 226 may intercept IOs in accordance with settings established by the replication session manager 262 (as described above). The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored.

Although a single file is shown for each of the lower-deck file systems 330 and 340, it is understood that each of the lower-deck file systems 330 and 340 may include any number of files, with each having its own entry in the respective inode table. In one example, each lower-deck file system stores not only the file F1 or F2, but also snaps of those files, and therefore snaps of the data objects the files store. For example, the first lower-deck file system 330 stores the first file 336 representing the LUN 310 along with a different file for each snap of the LUN 310. Similarly, the second lower-deck file system 340 stores the second file 346 representing the HFS 312 along with a different file for every snap of the HFS 312.

As shown, the storage pool 232 allocates slices 360 for providing storage for the first file 336 and the second file 346. In the example show, slices S1 through S4 store the data of the first file 336, and slices S5 through S7 store the data of the second file 346. The data that make up the LUN 310 are thus stored in the slices S1 through S4, whereas the data that make up the HFS 312 are stored in the slices S5 through S7.

II) Synchronous Replication of Block-Based and File-Based Objects:

Example techniques for performing synchronous replication on both block-based objects and file-based objects are now described in connection with FIGS. 4-7. As is known, "synchronous" replication refers to replication performed in band with IO requests 112 as the IO requests arrive. With synchronous replication, individual IO request data are generally persisted to a replica site on an individual basis, e.g., one-by-one, as the IO requests arrive. In contrast, "asynchronous" replication is performed out of band with individual IO requests, with replicas generated, for example, on demand, at regular intervals, and/or in response to particular events.

Figure 4:
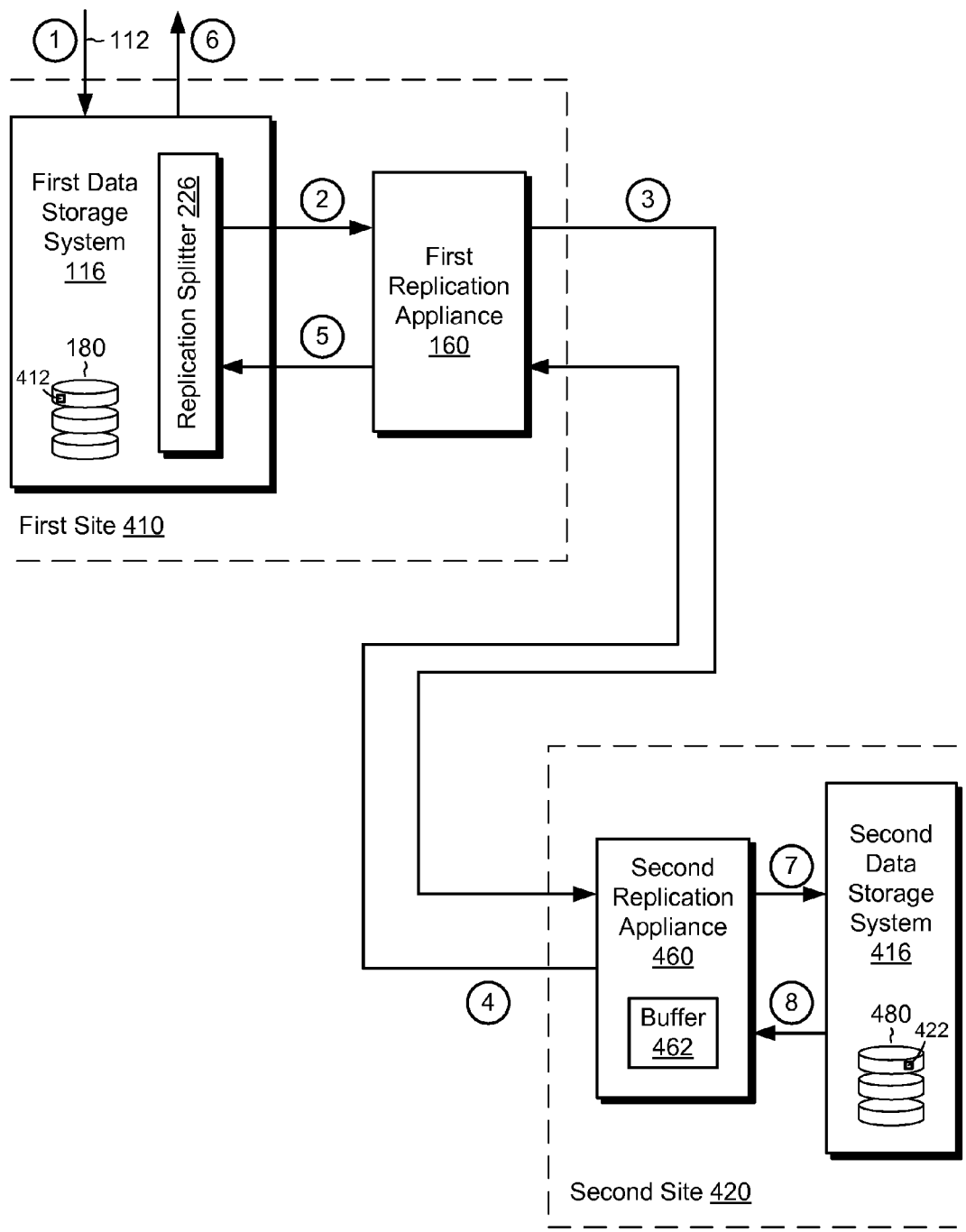
FIG. 4 is a block diagram showing synchronous replication between a first data storage system at a first site and a second data storage system at a second site.

FIG. 4 shows an example arrangement for performing synchronous replication of a data object 412 from a first data storage system 116 (as shown in FIG. 1) to a second data storage system 416. Here, the first data storage system 116 is located at a first site 410 and the second data storage system 416 is located at a second site 420. In an example, the first site 410 and the second site 420 are located at different geographical locations, such as in different buildings of a city or campus. The second data storage system 416 includes persistent storage 480 (e.g., disk drives, flash drives, and the like) and is operatively connected to a second replication appliance 460. The second replication appliance 460 includes a buffer 462, which may be implemented in non-volatile memory (e.g., on disk or flash). In some examples, the buffer 462 is implemented in high-speed non-volatile memory within the storage 480, but separate and apart from any replica storage. Further, the second replication appliance 460 may be included entirely within the second data storage 116, similar to the way in which the first replication appliance 160 is included within the first data storage system 116 (see FIG. 1). Although the components at the first site 410 and the second site 420 are shown to be different, they may alternatively be the same, so as to provide symmetrical behavior, with each site storing a replica of data objects from the other. As shown in this example, however, the first site 410 acts to receive and process IO requests 112 from hosts, whereas the second site 420 acts to provide a replica 422 of the data object 412 on the first site 410.

The encircled numbers in FIG. 4 identify an example sequence of events. At (1), the first data storage system 116 receives an IO request 112 specifying data to be written in the storage 180 for a particular data object 412 (e.g., a LUN, a host file system, a vVOL, etc.). The IO request 112 propagates down the IO stack 140 (FIG. 2) and encounters the replication splitter 226. The replication splitter 226 intercepts the IO request and temporarily prevents the IO request from propagating further down the IO stack 140 (FIG. 2). At (2), the replication splitter 226 sends the IO request (e.g., a version thereof) to the first replication appliance 160. At (3), the first replication appliance 160 forwards the IO request to the second replication appliance 460, which stores the data specified in the IO request in the buffer 462. At (4), the second replication appliance 460 acknowledges safe storage of the IO data to the first replication appliance 160 (e.g., that the IO data are persisted in the buffer 462). At (5), the first replication appliance 160 in turn acknowledges receipt to the replication splitter 226. Only when the replication splitter 226 receives the acknowledgement does the replication splitter 226 allow the IO request to continue propagating down the IO stack 140 (FIG. 2) to complete the write operation to the storage 180. At (6), the first data storage system 116 acknowledges completion of the IO request 112 back to the originating host. Asynchronously with the IO request, the second replication appliance 460 may de-stage the buffer 462 to the replica 422 of the data object maintained in the storage 480. For example, at (7), the data specified in the IO request are transferred from the buffer 462 to the storage 480, and at (8), the second data storage system acknowledges completion.

Many variants are contemplated. For example, the buffer 462 may be realized using volatile memory (e.g., RAM). In such cases, the second replication appliance 460 may wait to acknowledge a write to the first replication appliance 160 until it receives confirmation that the data specified in the IO request has been persisted in the replica 422 for the data object 412 in the storage 480.

As described, the first data storage system 116 conducts synchronous replication with the second data storage system 416 on a per-data-object basis and in accordance with object-specific settings. The replication session manager 162 establishes these settings and orchestrates replication activities, recovery activities, and failover activities. In an example, the GUI application 164 provides an entry point to the replication session manger 162 to allow users to specify object-specific settings. In some examples, the GUI application is configured to accept user input for managing a wide range of operations of the data storage system 116, including configuring pools, configuring block-based objects, and configuring file-based objects, as well as for managing replication. Although particular aspects of the GUI application 164 are described herein in relation to replication, it is understood that the GUI application 164 may have a much greater scope than for controlling replication alone. For example, in some implementations, the GUI application 164 is a modified form of the Unisphere integrated management tool, available from EMC Corporation of Hopkinton, Mass. Providing the GUI application 164 within Unisphere simplifies the user experience by avoiding for the user to operate a separate GUI for controlling replication.

Figure 5:
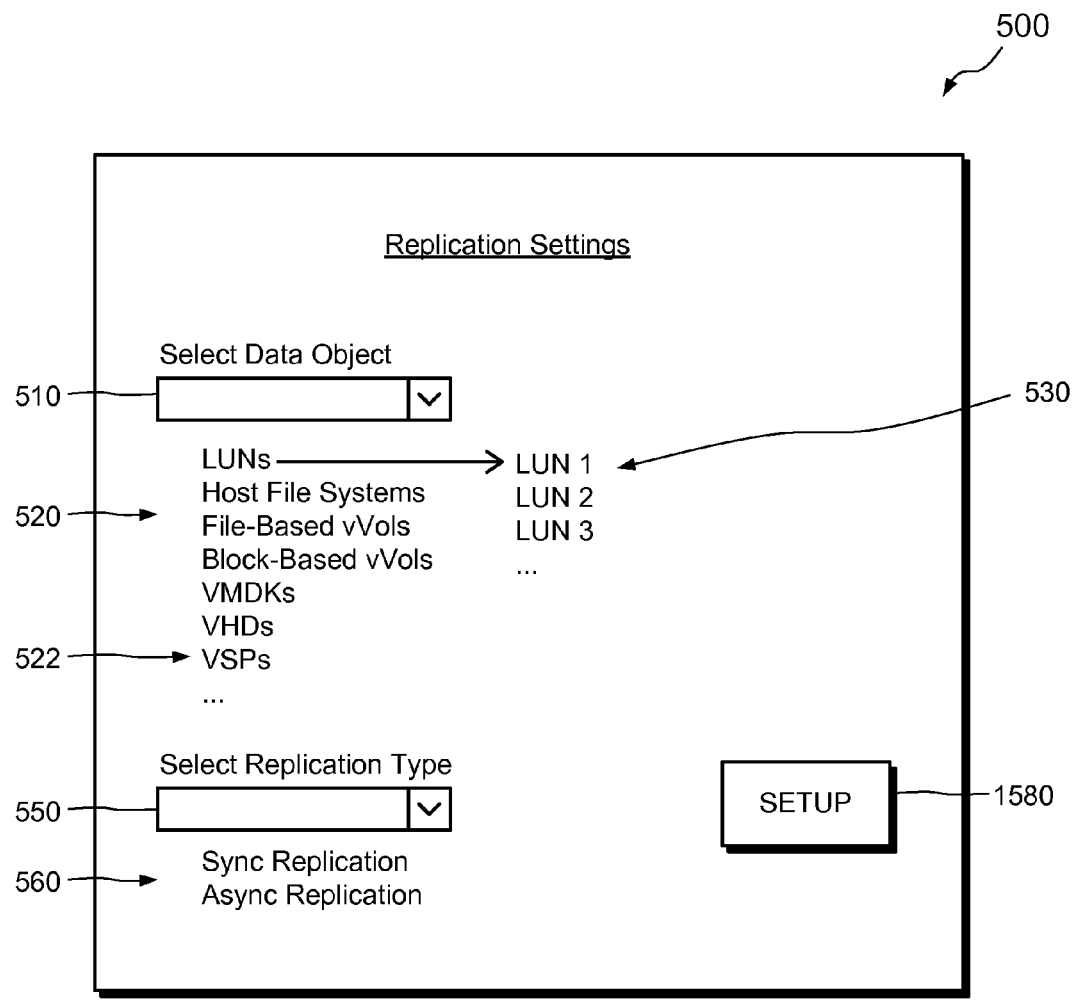
FIG. 5 is an example screen generated by a graphical user interface (GUI) application for establishing replication settings of data objects on a per-data-object basis.

FIG. 5 shows an example screen shot 500 of the GUI application 164 that allows users to specify object-specific replication settings. It is understood that the screen 500 is shown in simplified form and is intended to be merely illustrative. Here, the screen 500 includes a control 510 for selecting a desired data object. In an example, a user clicks the control 510 to reveal a list of available objects. The control 510 may organize the data objects in multiple levels, e.g., in a first level 520 that lists different types of data object (e.g., LUNs, Host File Systems, etc.) and in a second level 530 that lists particular data objects of a type the user selects from the first level 520 (e.g., LUN 1, LUN 2, etc.). In an example, the GUI application 164 queries the configuration database 170 and/or other databases to obtain lists of available data objects and stores such lists in connection with the control 510. A user may click the control 510 to display a list of object types objects in the first level 520. The user may then and click a desired type from the list displayed at first level 520 to cause the control 510 to display a list of data objects of the selected type in the second level 530. A different list is displayed in the second level 530 for each selection in the first level 520. The user may then click a particular listed data object to establish configuration settings for that object. For example, the user may click "LUNs" from the first level 520 and then click "LUN 2" from the second level 530 to configure settings for LUN 2.

The user may next click a control 550 to select a particular data protection operation. List 560 appears when the user clicks the control 550 and displays example options. These include, for example, "Synch Replication" for synchronous replication and "Async Replication" for asynchronous replication. The user may the click a button 580 ("SETUP") to configure settings for the selected replication type (selected via control 550) on the selected data object (selected via control 510).

Figure 6:
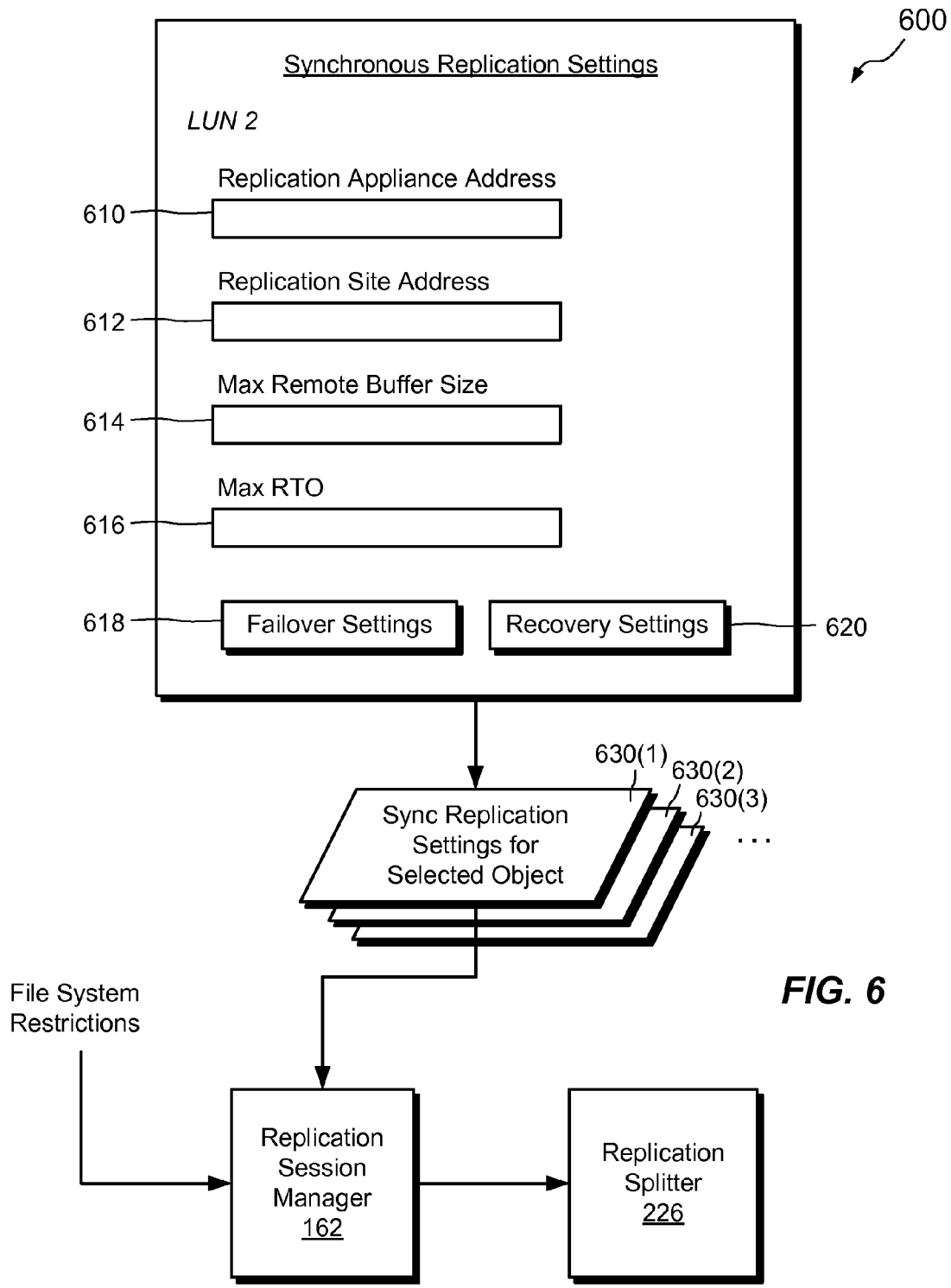
FIG. 6 is another example screen generated by the GUI application for establishing additional settings on a per-data-object basis.

FIG. 6 shows an example screen 600 of the GUI application 164, which the GUI application displays, for example, when the user selects "LUN 2" with the control 510 and selects "Sync Replication" from the control 550 (FIG. 5). The GUI application 164 thus accepts user input, via the screen 600, for establishing synchronous replication settings specific to LUN 2. It is understood that the screen 600 can be configured to accept settings for different data objects when the user selects them, e.g., using the control 510. Also, different screens may be displayed when the user selects different replication types (e.g., using the control 550).

The screen 600 accepts a number of different replication settings. These include, for example, the following settings:

Replication Appliance Address (610): The address (e.g., SCSI or IP address) of the replication appliance 160. Different replication appliance addresses may be provided for different data objects. For example, multiple replication appliances (like the appliance 160) may be connected to the data storage system 116 over a SAN (storage area network) or other network. Assigning different replication appliance addresses to different data objects causes different replication appliances to be used for replicating the respective objects. In some examples, replication appliances are arranged into clusters. In such cases, the Replication Appliance Address 610 may designate a cluster address. Where a cluster address is specified, the replication splitter 226 may select individual appliance units within a cluster based on load, for example.

Replication Site Address (612): The address (e.g., IP address) of a data storage system or a replication appliance at a second site. In the example of FIG. 4, the replication site address can be the address of the second replication appliance 460 or the address of an SP running on the second data storage system 416.

Max Remote Buffer Size (614): The maximum amount of data that may be stored in a buffer at the second site. In the example of FIG. 4, the Max Remote Buffer Size refers to the amount of data in the buffer 462 from IO requests 112 that have not yet been committed to the replica 422 in the storage 480. By setting Max Remote Buffer Size 614 to a large value, a considerable amount of time may be required to de-stage data to the replica 422 in the storage 480 to bring the replica 422 up to date with the data object at the first site 410. By setting Max Remote Buffer Size 614 to a small value, little time is needed to commit pending data, such that the replica 422 is kept nearly up to date with the original object at all times.

Max RTO (616): The maximum amount of time (Recovery Time Objective) that the data object may remain unavailable to hosts after the data object becomes unavailable at its source. In the example of FIG. 4, the Max RTO 616 is the maximum amount of time that is allowed to pass after a failure at the source before the replica of the data object in the storage 480 is brought up to date with the source and made available to hosts. In general, the more uncommitted IO requests that are pending in the buffer 462, the greater amount of time required to activate the replica. Therefore, an effective way to reduce RTO is set the Max Remote Buffer Size 614 to a small value. As Max RTO 616 is closely related to Max Remote Buffer Size 614, some implementations may not offer the option to control both.

The example settings 610, 612, 614, and 616 are shown for illustrative purposes. It is understood, however, that the particular settings shown are not necessarily required nor are they intended to represent all possible settings that may be desired.

The screen 600 is further seen to include buttons 618 and 620, for establishing failover settings and recovery settings, respectively, for the selected data object. In an example, clicking the button 618 brings up a failover screen (not shown) for accepting user input to establish failover settings for the data object. Failover settings may include, for example, an address of a failover site, a maximum allowable amount of data loss (RPO), a maximum RTO, as above, as well as other settings. Clicking the button 620 may bring up a recovery screen (not shown) for accepting user input to establish recovery settings for the selected data object. Recovery settings may include, for example, a recovery destination (e.g., a location to which a replica is to be restored), as well as maximum RPO and RTO settings to be applied for recovery operations.

Although the screens 500 and 600 have been shown and described in connection with a particular data object (LUN 2), it should be understood that similar screens may be presented for other LUNs, and for other types of data objects, with the screens 500 and 600 accepting user settings for any currently selected object. Thus, the GUI application 164 may be used for establishing replication, failover, and recovery settings on a per-data-object basis, with each data object having its own respective settings.

As further shown in FIG. 6, the GUI application 164 may generate output providing sync replication settings for the selected object. For example, the GUI application 164 may gather all user-established settings specified in the screens 500 and 600 (as well as any settings gathered from the failover screen and/or recovery screen) and provide such object-specific settings in an output file 630(1). Additional output files (e.g., 630(2), 630(3), . . . ) may be provided for other data objects, e.g., one per data object. It should be readily apparent, however, that object-specific settings may be stored in any suitable way, such as in different files (as shown), as a single file (e.g., an XML file), as records in a database, or in any number of other ways. In any case, the GUI application 164 sends the object-specific settings to the replication session manager 162, which receives the settings and applies them to establish replication sessions with replica sites for each data object in accordance with its respective settings. In this manner, the GUI application 164 may act as a single entry point to the replication session manager 162 for controlling replication on a per-object basis.

The replication session manager 162 may orchestrate any number of replication sessions at any given time, with each replication session operating to replicate a respective data object. For each replication session, the replication session manager 162 communicates with a respective replica site (e.g., with a counterpart replication session manager at the replica site) and coordinates replication activities in accordance with the object-specific settings. In the event of a failure at the data storage system 116 that renders a data object or the entire data storage system 116 unavailable, the replication session manager at the replica site can orchestrate failover and/or recovery operations in accordance with the same settings established in the replication session manager 162 on the data storage system 116.

As further shown in FIG. 6, the replication session manager 162 may also receive information describing file system restrictions. These restrictions may apply to upper-deck file systems. They may also apply to lower-deck file systems, i.e., to the file systems in which the file realizations of the data objects themselves are stored (FIGS. 2 and 3). Any of such file systems may operate subject to restrictions, such as restrictions prohibiting deletion prior to a certain date. These restrictions may include File Level Retention for compliance (FLR-C) and/or File Level Retention for enterprises (FLR-E). When restriction information is provided for a particular data object, the replication session manager 162 receives the information and includes it with the object-specific settings for the data object. When replication is conducted on the object, the replica site obtains the restriction information and applies the identified restrictions to the replica. The replica is thus made subject to the same restrictions as the original object.

Although the GUI application 164 accepts user input for establishing various replication settings for a data object, the replication session manager 162 may, in some examples, generate synchronous replication settings for a data object on its own, automatically, and without user input, and initiate a replication session for the data object with a destination object in accordance with the automatically generated settings. Thus, replication may proceed on a data object even if a user does nothing to establish replication settings.

Once the replication session manager 162 receives object-specific replication settings for a particular data object, the replication session manager 162 configures the replication splitter 226 (FIGS. 2-4) to operate in accordance with the settings for the respective object. In an example, the replication session manager 162 identifies a particular internal volume (FIGS. 2 and 3) in the IO stack 140 that the object-volume mapping 224 maps to the data object. The replication session manager 162 then activates the replication splitter 226 on the identified volume. Then, whenever the replication splitter 226 receives an IO request specifying data to be written to the internal volume mapped to the data object, the replication splitter 226 performs replication activities in accordance with the settings for the data object. These include, for example, sending the IO request to the replication appliance 160 designated in the settings for the object, configuring the buffer (e.g., 462), and so forth. Because the replication splitter 226 recognizes volumes and because the replication session manager 262 can identify the internal volume for each data object, the replication splitter 226 and the replication manager 260 can together manage replication on a per-data-object basis.

Figure 7:
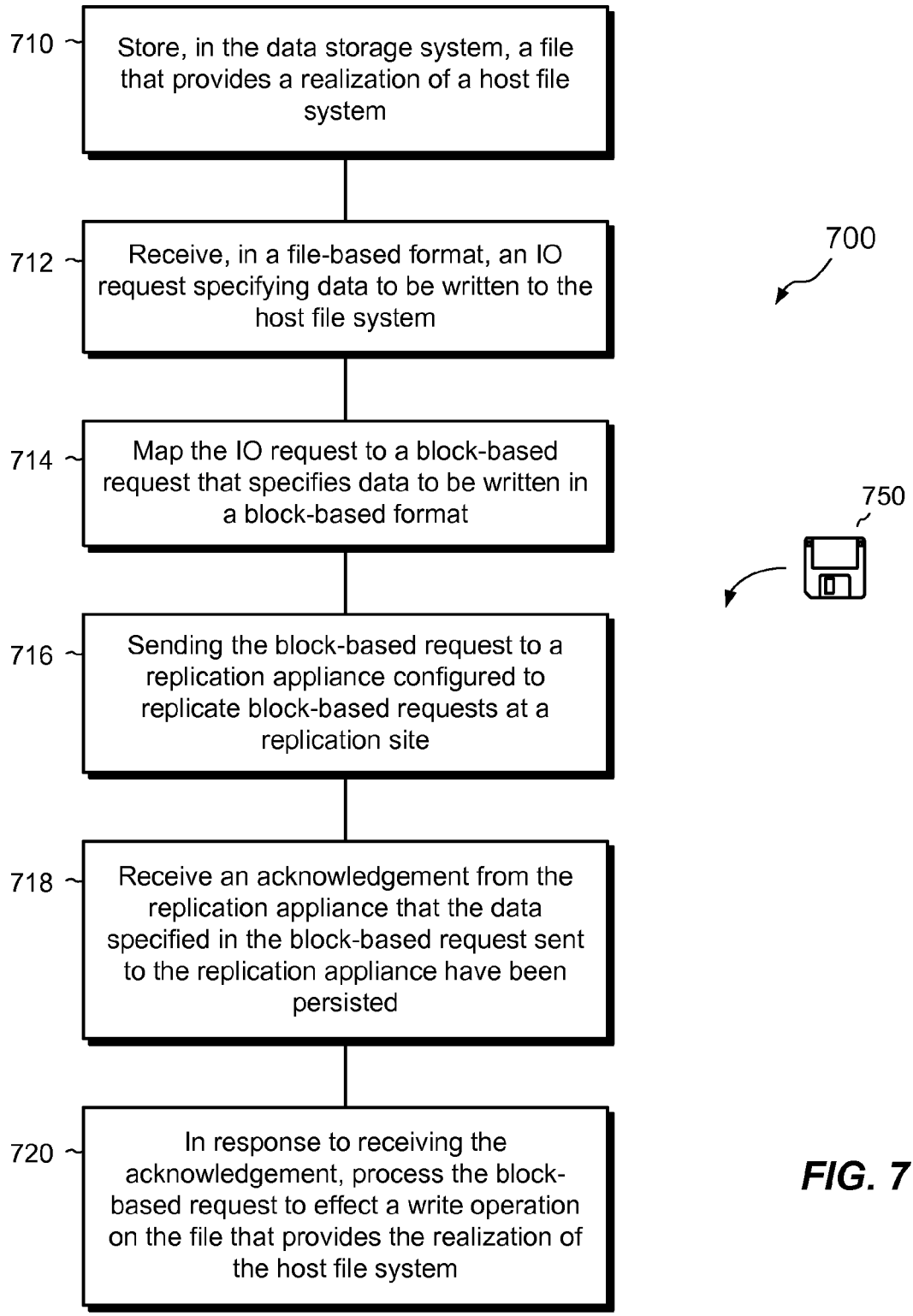
FIG. 7 is a flowchart showing an example process for performing synchronous replication in the data storage system of FIG. 1.

FIG. 7 shows an example method 700 for performing synchronous replication in a data storage system. The method 700 may be carried out, for example, in connection with the data storage apparatus 116, such as by the software constructs described in connection with FIGS. 1-3, which reside in the memory 130 of the storage processor 120 and are run by the set of processing units 124. The various acts of the method 700 may be ordered in any suitable way. Accordingly, embodiments may be constructed in which acts are performed in orders different from those illustrated, which may include performing some acts simultaneously, even though the acts are shown as sequential in the illustrated embodiments.

At step 710, a file is stored in a data storage system. The file provides a realization of a host file system. For example, file 346 (F2, see FIG. 3) is stored in lower-deck file system 340 and provides of a realization of the host file system HFS 1.

At step 712, an IO request specifying data to be written to the host file system is received in a file-based format. For example, IO request 112(3) (FIG. 1) may specify data to be written, e.g., to a file or directory, of HFS 1, and the SP 120 receives the IO request 112(3) from Host 3 in a file-based format (NFS).

At step 714, the IO request is mapped to a block-based request that specifies data to be written in a block-based format. For example, the Object-Volume mapping 224 in the IO stack 140 (FIG. 2) maps the file-based IO request 112(3) to a block-based request 112a directed to a particular internal volume, e.g., the internal volume that provides the volume realization of HFS 1. The block-based request specifies 112a data to be written in a block-based format (e.g., according to SCSI semantics), which may identify the particular internal volume and an offset range within the volume.

At step 716, the block-based request 112a is sent to a replication appliance configured to replicate block-based requests at a replication site. For example, the replication splitter 226 receives the block-based request 112a via the IO stack 140 and sends the block-based request 112a (or a version thereof) to the replication appliance 160 configured to replicate the block-based requests at the second site 420 (see FIG. 4). In an example, the replication appliance 160 is configured according to the data-object-specific replication settings (FIG. 6) for HFS 1 and may be controlled by the replication session manager 162 through the replication splitter 226 (e.g., via SCSI semantics) or directly (e.g. via API calls).

At step 718, an acknowledgement is received from the replication appliance that the data specified in the block-based request sent to the replication appliance have been persisted. For example, as shown in FIG. 4, the replication splitter 226 receives an acknowledgement at (5) confirming that the data specified in the block-based request 112a (or version thereof) sent to the second site 420 at (3) have been persisted (e.g., in the buffer 462 or in the replica 422 within the storage 180).

At step 720, in response to receiving the acknowledgement, the block-based request is processed to effect a write operation on the file that provides the realization of the host file system. For example, returning to FIGS. 2 and 3, the block-based request 112a is released from the replication splitter 226 and propagates down the IO stack 140, where it is processed to write to particular slices (e.g., any of S5-S7) of the file 346 (F2) that provides the realization of HFS 1.

An improved technique has been described for performing synchronous replication on both block-based objects and file-based objects. The technique may be used in connection with a data storage system 116 that internally stores data objects (e.g., LUNs, file systems, block-based vVOLs, file-based vVOLs, VMDKs, etc.) in the form of respective files (e.g., files 336, 346), such that each file provides a realization of a data object. The data storage system 116 maps each such file to a respective logical volume (e.g., 324, 326), and each logical volume provides a block-based interface. As the data storage system receives IO requests 112 (e.g., from hosts 110(1) to 110(N)) specifying data to be written to a data object, the data storage system 116 renders the IO requests as block-based requests, regardless of whether the IO requests are themselves block-based or file-based. A block-based replication splitter intercepts the block-based requests directed to the logical volumes and performs block-based, synchronous replication on the block-based requests, thereby achieving synchronous replication of both block-based objects and file-based objects in a single, unified architecture. The improved technique typically results in a reduced need for multiple, diverse replication solutions, and thus fewer items that must be purchased, learned, and maintained.

The improved technique may further benefit users and organizations by adapting management software for file-based replication solutions to provide common replication management across all object types (e.g., via the replication session manager 162 and GUI application 164). Thus, the advanced features that file-based replication solutions deliver, e.g., for establishing and maintaining replication sessions, managing recovery and failover, and ensuring that particular settings and restrictions applied to file systems being replicated carry over to replicas at the destination site, can be leveraged across all object types, whether they be block-based or file-based.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of performing synchronous replication in a data storage system, comprising:
   storing, in the data storage system, a file that provides a realization of a host file system;
   receiving, in a file-based format, an IO request specifying data to be written to the host file system;
   mapping the IO request to a block-based request that specifies data to be written in a block-based format;
   sending the block-based request to a replication appliance configured to replicate block-based requests at a replication site;
   receiving an acknowledgement from the replication appliance that the data specified in the block-based request sent to the replication appliance have been persisted;
   in response to receiving the acknowledgement, processing the block-based request to effect a write operation on the file that provides the realization of the host file system; and
   configuring, via a GUI (graphical user interface) application, a replication session manager for establishing a set of replication settings for the host file system, wherein the GUI application accepts user input for managing a range of operations of the data storage system, including configuring pool, configuring block-based objects and configuring file-based objects.

2. The method of claim 1, further comprising:
   storing, in the data storage system, a second file that provides a realization of a LUN (logical storage unit);
   receiving, in a block-based format, a second IO request specifying data to be written to the LUN;
   sending the second IO request to the replication appliance;
   receiving a second acknowledgement from the replication appliance that the data specified in the second IO request sent to the replication appliance have been persisted; and
   in response to receiving the second acknowledgement, processing the second IO request to effect a write operation on the second file that provides the realization of the LUN.

3. The method of claim 1, further comprising:
   storing, in the data storage system, a third file that provides a realization of a vVOL (virtual volume);
   receiving a third IO request specifying data to be written to the vVOL;
   sending the third IO request to the replication appliance;
   receiving a third acknowledgement from the replication appliance that the data specified in the third IO request sent to the replication appliance have been persisted; and
   in response to receiving the third acknowledgement, processing the third IO request to effect a write operation on the third file that provides the realization of the vVOL.

4. The method of claim 2, further comprising:
   configuring, via the GUI application, the replication session manager for establishing a second set of replication settings for the LUN.

5. The method of claim 4, wherein the acts of sending the block-based request to the replication appliance and sending the second IO request to the replication appliance are performed by a replication splitter, and wherein the method further comprises the replication session manager (i) configuring the replication splitter to respond to IO requests directed to the host file system according the first set of replication settings established for the host file system and (ii) configuring the replication splitter to respond to IO requests directed to the LUN according the second set of replication settings established for the LUN.

6. The method of claim 5, wherein storing the second file includes providing the second file as part of an internal file system of the data storage system, the internal file system having associated therewith a set of restrictions to actions that may be performed on files of the internal file system, and wherein configuring the replication splitter to respond to IO requests directed to the LUN according the second set of replication settings includes directing the replication splitter to perform synchronous replication in compliance with the set of restrictions that apply to the internal file system in which the second file is provided.

7. The method of claim 5, further comprising:
   configuring, via the GUI application, the replication session manager for establishing a first set of failover settings for the host file system; and
   configuring, via the GUI application, the replication session manager for establishing a second set of failover settings for the LUN,
   wherein the GUI application accepts user input for managing a range of operations of the data storage system, including configuring pools, configuring block-based objects and configuring file-based objects.

8. The method of claim 2, further comprising:
running a replication session manager in the data storage system; and
creating, by the replication session manager, synchronous replication sessions with destination objects for storing replicas of the host file system and the LUN automatically and without user specification of particular destination objects.

9. A data storage apparatus, comprising a set of processing units and memory, the memory coupled to the set of processing units, the set of processing units and the memory together forming a controller constructed and arranged to:
store, in the data storage system, a file that provides a realization of a host file system;
receive, in a file-based format, an IO request specifying data to be written to the host file system;
map the IO request to a block-based request that specifies data to be written in a block-based format;
send the block-based request to a replication appliance configured to replicate block-based requests at a replication site;
receive an acknowledgement from the replication appliance that the data specified in the block-based request sent to the replication appliance have been persisted;
in response to receiving the acknowledgement, process the block-based request to effect a write operation on the file that provides the realization of the host file system; and
configure, via a GUI (graphical user interface) application, a replication session manager for establishing a set of replication settings for the host file system,
wherein the GUI application accepts user input for managing a range of operations of the data storage system, including configuring pools, configuring block-based objects and configuring file-based objects.

10. The data storage apparatus of claim 9, wherein the controller is further constructed and arranged to:
store, in the data storage system, a second file that provides a realization of a LUN (logical storage unit);
receive, in a block-based format, a second IO request specifying data to be written to the LUN;
send the second IO request to the replication appliance;
receive a second acknowledgement from the replication appliance that the data specified in the second IO request sent to the replication appliance have been persisted; and
in response to receiving the second acknowledgement, process the second IO request to effect a write operation on the second file that provides the realization of the LUN.

11. The data storage apparatus of claim 10, wherein the controller is further constructed and arranged to:
store, in the data storage system, a third file that provides a realization of a vVOL (virtual volume);
receive a third IO request specifying data to be written to the vVOL;
send the third IO request to the replication appliance;
receive a third acknowledgement from the replication appliance that the data specified in the third IO request sent to the replication appliance have been persisted; and
in response to receiving the third acknowledgement, process the third IO request to effect a write operation on the third file that provides the realization of the vVOL.

12. The data storage apparatus of claim 10, wherein the controller is further constructed and arranged to:
configure, via the GUI application, the replication session manager for establishing a second set of replication settings for the LUN.

13. The data storage apparatus of claim 11, wherein the controller is constructed and arranged to send the block-based request to the replication appliance and to send the second IO request to the replication appliance via a replication splitter, and wherein the controller is further constructed and arranged to operate the replication session manager to (i) configure the replication splitter to respond to IO requests directed to the host file system according the first set of replication settings, established for the host file system and (ii) configure the replication splitter to respond to IO requests directed to the LUN according the second set of replication settings, established for the LUN.

14. A computer program product having a non-transitory computer-readable medium including instructions which, when executed by a controller of a data storage apparatus, cause the controller to perform a method of performing synchronous replication in a data storage system, comprising:
storing, in the data storage system, a file that provides a realization of a host file system;
receiving, in a file-based format, an IO request specifying data to be written to the host file system;
mapping the IO request to a block-based request that specifies data to be written in a block-based format;
sending the block-based request to a replication appliance configured to replicate block-based requests at a replication site;
receiving an acknowledgement from the replication appliance that the data specified in the block-based request sent to the replication appliance have been persisted;
in response to receiving the acknowledgement, processing the block-based request to effect a write operation on the file that provides the realization of the host file system; and
configuring, via a GUI (graphical user interface) application, a replication session manager for establishing a set of replication settings for the host file system,
wherein the GUI application accepts user input for managing a range of operations of the data storage system, including configuring block-based objects and configuring file-based objects.

15. The computer program product of claim 14, wherein the method further comprises:
storing, in the data storage system, a second file that provides a realization of a LUN (logical storage unit);
receiving, in a block-based format, a second IO request specifying data to be written to the LUN;
sending the second IO request to the replication appliance;
receiving a second acknowledgement from the replication appliance that the data specified in the second IO request sent to the replication appliance have been persisted; and
in response to receiving the second acknowledgement, processing the second IO request to effect a write operation on the second file that provides the realization of the LUN.

16. The computer program product of claim 15, wherein the method further comprises:
configuring, via the GUI application, the replication session manager for establishing a second set of replication settings for the LUN.

17. The computer program product of claim 16, wherein the acts of sending the block-based request to the replication appliance and sending the second IO request to the replication appliance are performed by a replication splitter, and wherein the method further comprises the replication session manager (i) configuring the replication splitter to respond to IO requests directed to the host file system according the first set of replication settings, established for the host file system and (ii) configuring the replication splitter to respond to IO requests directed to the LUN according the second set of replication settings, established for the LUN.

18. The computer program product of claim 17, wherein storing the second file includes providing the second file as part of an internal file system of the data storage system, the internal file system having associated therewith a set of restrictions to actions that may be performed on files of the internal file system, and wherein configuring the replication splitter to respond to IO requests directed to the LUN according the second set of replication settings includes directing the replication splitter to perform synchronous replication in compliance with the set of restrictions that apply to the internal file system in which the second file is provided.

19. The computer program product of claim 16, wherein the method further comprises:

configuring, via the GUI application, the replication session manager for establishing a first set of failover settings for the host file system; and configuring, via the GUI application, the replication session manager for establishing a second set of failover settings for the LUN, wherein the GUI application accepts user input for managing a range of operations of the data storage system, including configuring pools, configuring block-based objects and configuring file-based objects.

20. The computer program product of claim 15, wherein the method further comprises:

running a replication session manager in the data storage system; and creating, by the replication session manager, synchronous replication sessions with destination objects for storing replicas of the host file system and the LUN automatically and without user specification of particular destination objects.

* * * * *